United States Patent [19]
Hirschel

[11] 3,714,552
[45] Jan. 30, 1973

[54] METHOD OF REDUCING ERRORS ARISING FROM THE RADIO FREQUENCY OSCILLATOR SYSTEM OF OPTICALLY PUMPED MAGNETOMETERS

[75] Inventor: Louis R. Hirschel, Silver Spring, Md.

[73] Assignee: The United States of America as represented by the Secretary of the Navy

[22] Filed: Jan. 19, 1972

[21] Appl. No.: 218,970

[52] U.S. Cl. ..............................................324/0.5 R
[51] Int. Cl. ..............................................G01r 33/08
[58] Field of Search ...............324/0.5 R, 0.5 E, 0.5 F

[56] References Cited

UNITED STATES PATENTS 3,524,128 8/1970 Hearn ..............................324/0.5 F
3,467,856 9/1969 Hearn ..............................324/0.5 F

*Primary Examiner*—Michael J. Lynch
*Attorney*—R. S. Sciascia et al.

[57] ABSTRACT

An optically pumped magnetometer utilizing the phenomenom of multiple photon transitions in helium. Multiple transition makes possible the use of two oscillators of any frequency in an He magnetometer, whose total quantum energy and angular momentum are equivalent to the values required by single-field irradiation. A field at frequency $f_1$ is generated by means of a crystal-controlled oscillator and a field at frequency $f_2$ is generated by a voltage-controlled oscillator such that $f_1 >> f_2$, whereby a circularly-polarized field may be generated by the crystal-controlled oscillator, which virtually eliminates the Bloch-Siegert effect and results in a very stable system. To conserve angular momentum in such a system, the two oscillators have their coils mounted perpendicular to one another.

4 Claims, 11 Drawing Figures

METHOD OF REDUCING ERRORS ARISING FROM THE RADIO FREQUENCY OSCILLATOR SYSTEM OF OPTICALLY PUMPED MAGNETOMETERS

BACKGROUND OF THE INVENTION

This invention relates generally to optically pumped magnetometers and more particularly to a system for eliminating the Bloch-Siegert effect normally found in optically pumped magnetometers.

The disorienting oscillator of an optically-pumped magnetometer is generally voltage-controlled and forms part of a feedback control system which provides automatically a signal proportional to the total magnetic field at the magnetometer site. Two limitations to such a control system are (a) the alteration of the true magnetic field arising from the presence of an unwanted circularly-polarized component of the disorienting field (Bloch-Siegert effect) and (b) the presence of oscillator frequency instability.

SUMMARY OF THE INVENTION

Accordingly, one object of the present invention is to provide a more stable magnetometer oscillator system.

Another object of the present invention is to provide a magnetometer having increased sensitivity and capable of measuring a greater dynamic range.

A still further object of the present invention is to eliminate the frequency-shift errors arising from the Bloch-Siegert effect present in current magnetometers.

Yet another object of the present invention is to provide multiple photon transitions in magnetometers.

Briefly, in accordance with one embodiment of the present invention, these and other objects are attained by providing a method and apparatus to overcome the abovementioned limitations.

Two disorienting oscillators are used to provide radio-frequency quanta at frequencies $f_1$ and $f_2$ and angular momenta, $P_1$ and $P_2$, consistent with the conservation principles which permit multiple-quanta transitions. If frequency $f_1$ is generated by a crystal-controlled oscillator and $f_2$ generated by a voltage-controlled oscillator such that $f_1 >> f_2$, it is possible to provide a circularly-polarized disorienting field and virtually eliminate the Bloch-Siegert effect. An additional benefit is brought about by the introduction of the crystal-controlled oscillator is the decrease in oscillator-system instability by a factor of $f_2/f_1$.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawing wherein.

DESCRIPTION OF THE PREFERRED EMBODIMENT

Figures 1, 2:
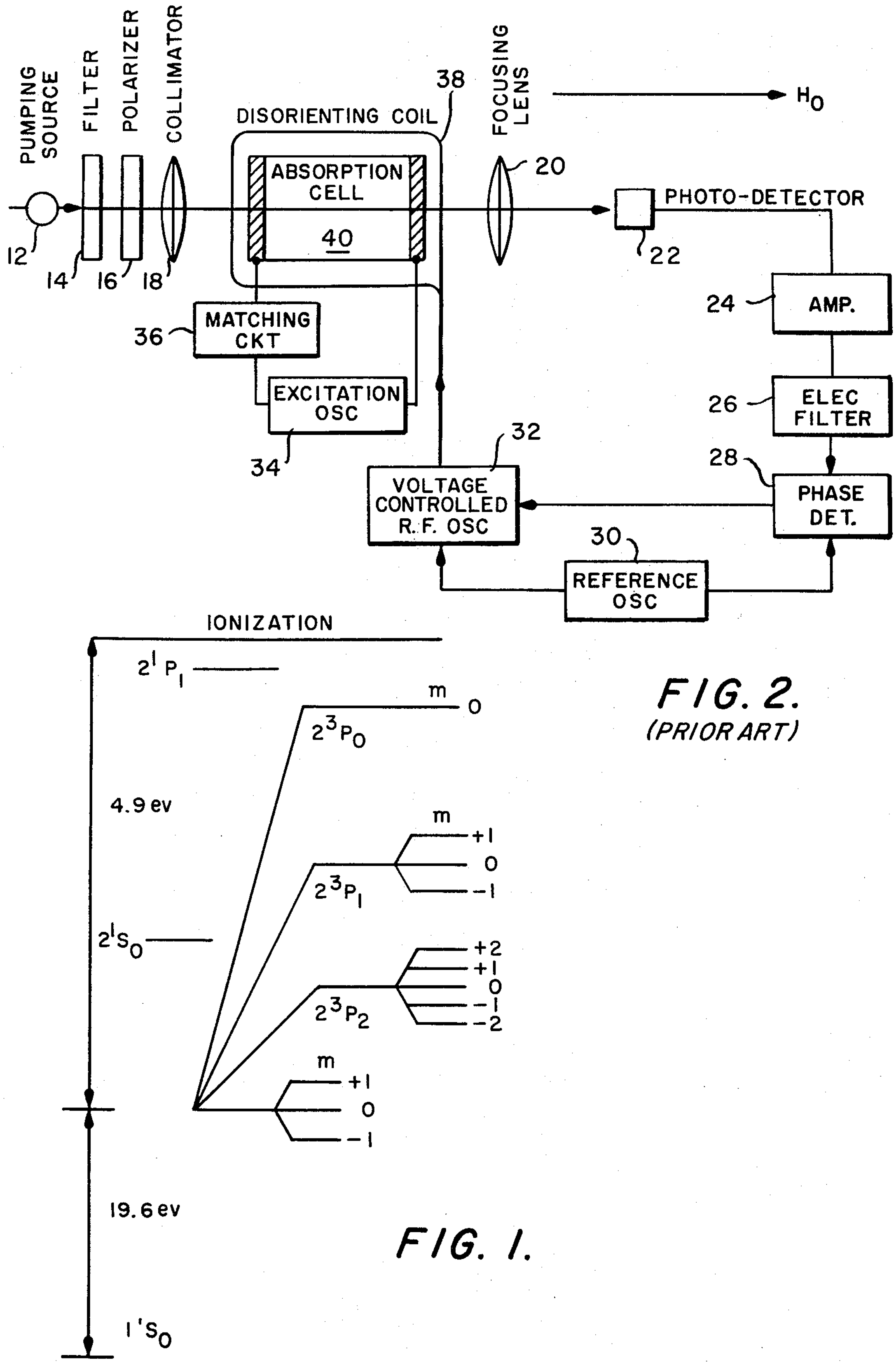
FIG. 1 is a schematic representation of energy levels and splittings in a magnetic field pertinent to the metastable helium magnetometer.
FIG. 2 is a schematic block diagram of a prior art magnetometer.

The principles of optical pumping and their applicability to the optically-pumped magnetometer are well known and fully reported in the literature. A gas with suitable atomic structure, at an appropriate pressure, enclosed in a transparent cell, is excited by means of high-frequency radio waves. Under such a condition of excitation of the gas, which is referred to as a plasma, may contain, depending upon the nature of the gas, atomic ions, molecular ions, electrons, non-ionized atoms and metastable atoms. These atomic species possess possible energy distributions in accordance with the principles of behavior for atomic systems described by quantum mechanics. Reference to a particular gas is generally made in terms of an energy level diagram which schematically shows the possible energies that an atom may assume when it is excited. Such energy level diagrams may be quite complex, so that it is customary to show only that portion of the representation which is pertinent to the operation of the magnetometer. FIG. 1 shows the energy levels and the resultant splittings in a magnetic field pertinent to the metastable helium magnetometer. FIG. 2 shows schematically the arrangement and component parts of a magnetometer of a type currently in use. More particularly, pumping light from a fairly intense source 12, using the same type of atoms as the absorption cell 40, after being suitably filtered by filter 14 and polarized by polarizer 16, is passed through the absorption cell and allowed to fall on the sensitive area of a photo-detector 22. The absorption cell 40 is excited by a high-frequency radio oscillator 34, the cell being matched to the oscillator by matching network 36. A collimating lens 18 and a focusing lens 20 are properly positioned to maximize the energy at the photo-detector 22 surface and provide uniform irradiation over the cross-sectional area of the absorption cell 40. The action of the pumping light is to raise the energy of the metastable $2^3S_1$ atoms contained in the absorption cell 18 to the $2^3P_{0,1,2}$ levels in accordance with the selection principles provided by quantum mechanics. The rate of absorption of the metastable ground state depends on: (a) the pumping light intensity, (b) the transition probability between the initial and final level, and (c) the angle which the incoming radiation makes with the direction of the external magnetic field.

Figures 3, 4:
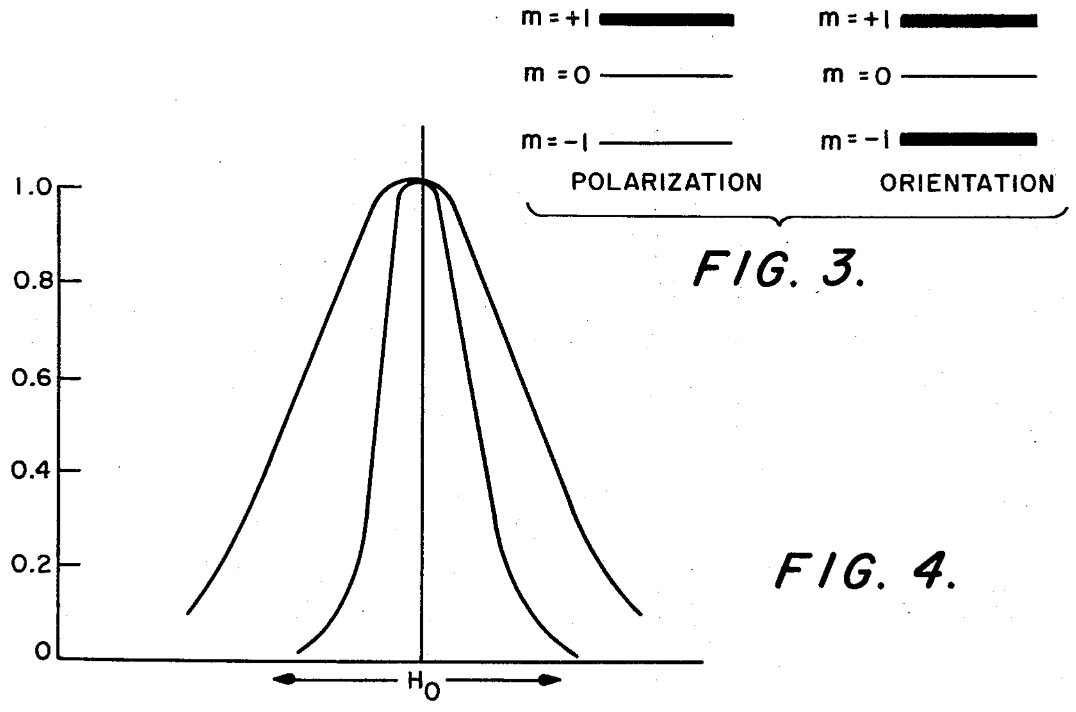
FIG. 3 is a schematic representation of the ground state levels for metastable helium.
FIG. 4 is a graph of the absorption characteristic of a gas.
Figures 5, 7:
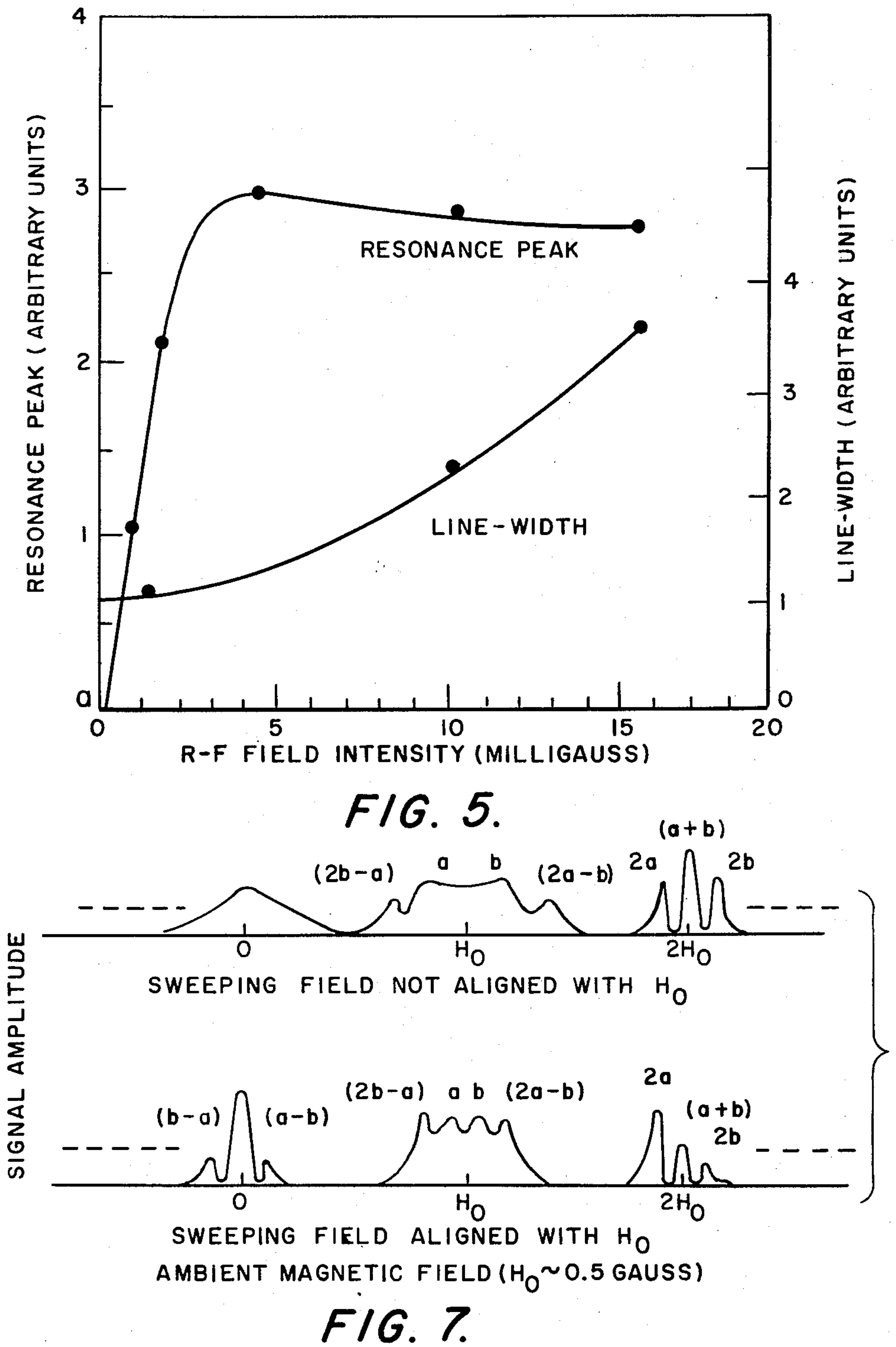
FIG. 5 is a graph representing the relationship between peak value of the resonance line and linewidth as a function of RF field intensity.
FIG. 7 illustrates the resonances observed in the presence of two RF fields of different frequency.

When the atoms return to the $2^3S_1$ sublevels of the ground state by spontaneous emission, these levels are differentially populated in accordance with the dynamics of the optical-pumping process. In the steady state, depending upon the polarization of the pumping-light and the direction of the magnetic field with respect to the absorption cell, the sublevels of the ground state may be so populated as to yield an alignment or orientation. When circularly polarized light is used with metastable-helium atoms one achieves an orientation while an alignment is possible with unpolarized light. The two situations are illustrated in FIG. 3, by means of the schematic representation of the ground-state levels for metastable helium, where the density of the line representing the energy level is an indication of the population of the level. Whether there exists an alignment or orientation, the differential populations of atoms in the sublevels provide a means for determining the total magnetic field at the site of the absorption cell. Where orientation exists the gas has a magnetic moment, where alignment exists the net magnetic moment is zero. The separation in energy, $\epsilon$ , of the $2^3S_1$ magnetic sublevels is determined by the presence of a magnetic field, $H_o$, such that $$\epsilon = hf_o = g\beta H_o \qquad (1)$$

where $g$ is the Lande splitting or g-factor and $\beta$ is the value of the Bohr magneton. From Eq. (1) one immediately obtain the well-known Larmor relation between frequency $f_o$ and $H_o$, $$f_o = \gamma H_o \qquad (2)$$

where $\gamma$ is the gyromagnetic ratio which for the case of metastable helium is 2.8 mHz/Oe. In either case, orientation or alignment, the atoms are precessing about the field $H_o$ at a frequency $f_o$ given by Eq. (2). When the radio-frequency field coild 38 in FIG. 2 is energized at a frequency in the vicinity of $f_o$, transitions occur between the ground state sublevels with maximum effectiveness at $f_o$, such that in the steady state the populations will be equalized, destroying either orientation or alignment. The gas is now in a condition to absorb energy from the pumping-light beam making it less transparent than it was prior to disorientation. The variation in transparency may be detected by means of a photo-detection device with suitable sensitivity and frequency response. By applying a radio-frequency field, whose frequency varies at an audio rate, in the vicinity of $f_o$, the variation in transparency of the gas (absorption characteristic or absorption line) may be displayed on an oscilloscope. The shape of the absorption characteristic so obtained and illustrated in FIG. 4 supplies the basic information necessary for a magnetic field determination. FIG. 5 shows the experimentally obtained relationship between peak value of the resonance line and line-width as a function of radio-frequency field intensity. The frequency $f_o$ at the center of the absorption characteristic of "line" may be measured with an accuracy limited, aside from noise considerations, by the instability of the disorienting oscillator, and the Bloch-Siegert effect, an inherent defect of oscillator systems in current use whereby the radio-frequency field itself produces a shift from the true central frequency $f_o$. This latter defect will be discussed in detail hereinafter. The sensitivity limitation resulting from oscillator instability for an oscillator in a feedback control system, as normally employed in practical magnetometers, is quantitatively expressed by $\Delta V/G$, where G is the gain of the feedback control system and $\Delta V$ is a measure of the oscillator instability. Thus to achieve a high sensitivity one must have a means of obtaining high oscillator stability. While the quartz crystal furnishes exceptionally good frequency stability, the requirements of a feedback control system for a magnetometer demand a voltage-controlled oscillator. Such oscillators require sophisticated and complex circuitry in order to achieve high stability, due care being taken to assure: (a) supply voltage stability, (b) transistor operating-point stability, (c) component temperature-compensation, (d) low temperature-rate of incremental permeability of the voltage-controlled frequency determining device, (e) proper buffering of frequency-determining network, and (f) compensation for component aging. To achieve the desired oscillator stability over long time periods, without the use of a quartz crystal, imposes stringent requirements on the oscillator design and presents the basic limitation to the measurement of magnetic fields.

In practice, as indicated in FIG. 2, the voltage controlled radio-frequency oscillator 32 is frequency modulated at an audio rate in accordance with the setting of reference oscillator 30 causing a small deviation above and below the central frequency which is established by the voltage applied from phase-detector 28. The resultant signal at the photo-detector is an audio signal whose amplitude is proportional to the slope of the absorption line at the central frequency of the oscillator. Varying the central oscillator frequency through the range of the absorption line will therefore yield an audio signal whose amplitude traces out the first derivative of the absorption line so that when the oscillator is set at the center frequency $f_o$ of the absorption line, the output signal is zero while on either side of this frequency, the audio signal increases but with opposite phase. The advantage of such a system is that by means of a phase detector one can extract a signal voltage, positive, negative or zero, which will drive the frequency of the voltage-controlled oscillator higher or lower in accordance with the variations in magnetic field, so that the frequency is always (except for control system errors) at the center of the absorption line, providing a measurement directly proportional to the magnetic field as shown by Eq. (2). The functions of the amplifier 34 and electrical filter 36 are self-explanatory and need not be considered here. The important features of the magnetometer for the present purpose are associated with the voltage-controlled oscillator, which provides the energy for disorienting the atoms and sets the frequency by which the magnetic field may be calculated.

Figure 8:
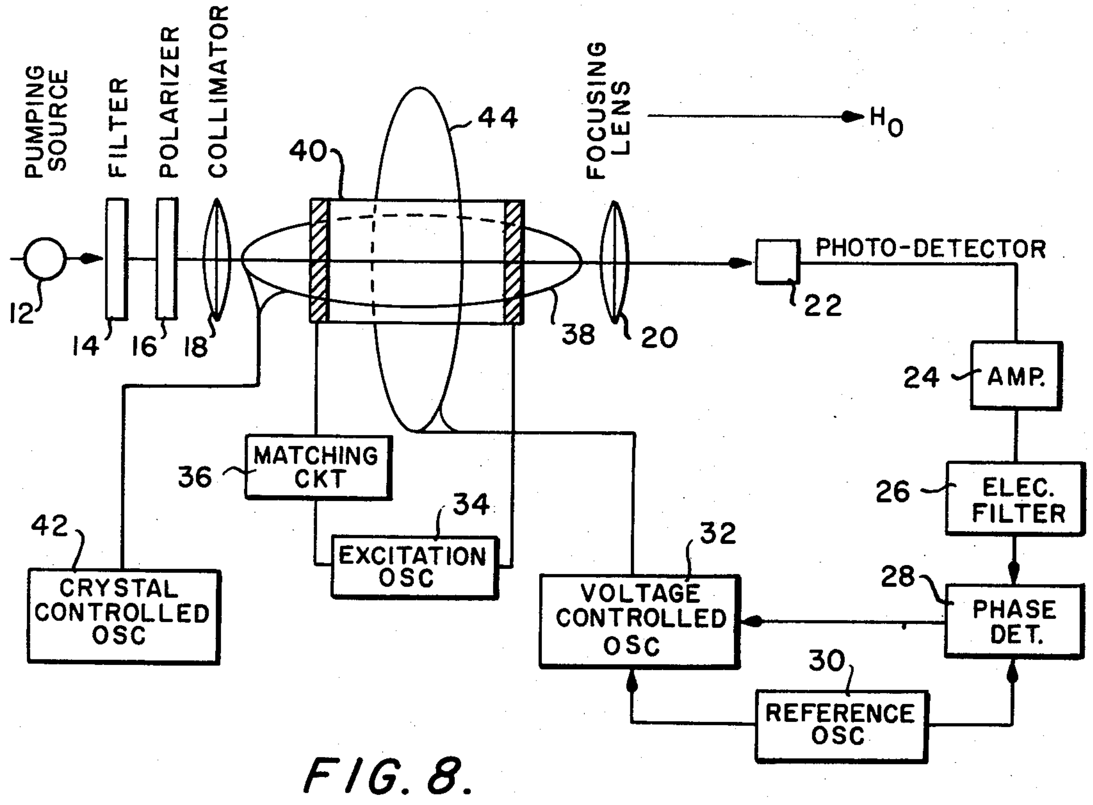
FIG. 8 is a schematic block diagram of the magnetometer embodying the features at the present invention.
Figure 6:
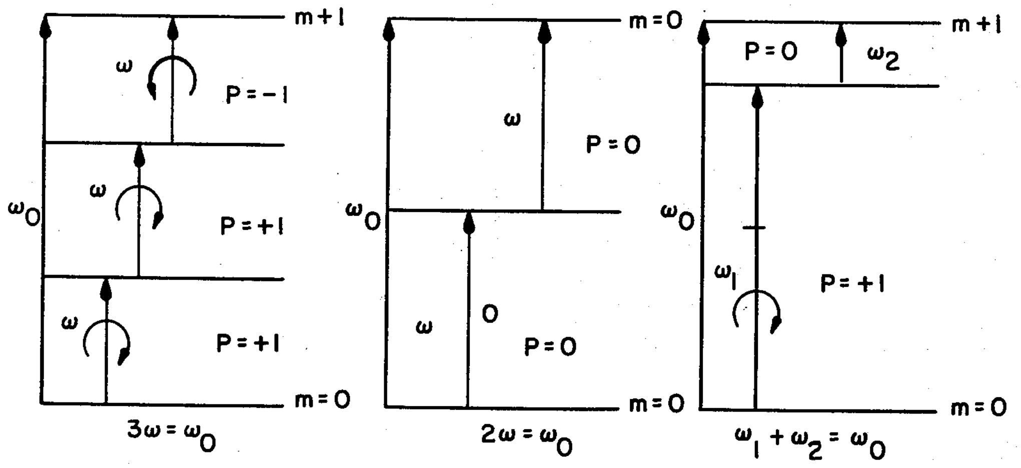
FIG. 6 is a schematic representation of multiple photon transitions.

The improvement over the magnetometer now in use makes use of the results of experiments on helium, wherein the optically-pumped gas is simultaneously subjected to two or more disorienting radio-frequency fields combined in such a manner so as to produce transitions between the ground state sublevels. Such a process also derives theoretical justification from the principles of quantum mechanics and by conforming to the fundamental rules of physics by requiring that both angular mementum and energy be conserved. The choice of helium as the experimental medium, therefore, does not restrict the validity of the process. Stated quantitatively, the conditions to be satisfied in order that a transition occurs are:

$$\Sigma_i n_i \omega_1 = \omega_o \qquad (3)$$

and $$\Sigma_i P_i = \pm 1, 0 \qquad (4)$$

where $n_i$ is the number of quanta at angular frequency $\omega_i$ involved in the transition, $\omega_o$ is the angular Larmor Frequency, and $P_i$ is the angular momentum of the quantum. When two or more frequencies combine in the manner indicated to effect a transition the process is referred to as a "multiple-quantum transition." Such transitions may be represented by the diagrams shown in FIG. 6, where quanta with various angular frequencies and angular momenta 0 and +1 combine to produce a transition between levels characterized by $m = 0$ and $m = +1$. The sum of the angular momenta is +1 as demanded by the quantum mechanical selection rule for a transition to occur between levels $m = 0$ and $m = +1$, and the sum of the angular frequencies is $\omega_o$ as demanded by energy conservation. FIG. 7 shows the observed resonances in the presence of two radio-frequency fields with frequencies a and b near to each other, as a function of the ambient field. FIG. 8 shows schematically a system for producing multiple-quantum transitions. The main departures from the conventional arrangement of the prior art magnetometer of FIG. 2, are the addition of coil 44, orthogonal to coil 38, and the addition of oscillator 42. In FIG. 8 oscillator 42 energizes coil 38 and oscillator 32 energizes coil 44. The latter, for purposes of this scheme, however, will be operating at a much lower frequency than in a conventional helium magnetometer system. Such an arrangement permits multiple-quantum transitions to take place using two frequencies, oscillator 42 being set at frequency $f_x$, and oscillator 32 at frequency $f_v$ so that $f_x + f_v$ is equal to $f_o$, the resonant frequency. In addition, the angular momentum is conserved. That this is so with the arrangement of coils presented in FIG. 8 will now be demonstrated. It is well-known that when an alternating current is passed through a circularly-formed coil, the linearly polarized magnetic field $H_1$ generated at the center of the coil is equivalent to two fields each of magnitude $H_1/2$ and circularly polarized in opposite directions. It is clear therefore that in a conventional magnetometer the proper component will act to cause disorientation regardless whether alignment or orientation exists. Since the correct angular momentum, component is always present all that is necessary is to fix the frequency of the disorienting oscillator. As shown in FIG. 8, coil 38 is energized by means of a crystal-controlled oscillator 42 operating at frequency $f_x$ near to resonance at frequency $f_o$ and thus able to generate as usual circularly-polarized magnetic fields with positive and negative angular momentum. Orthogonal coil 44 is energized by oscillator 32, but being orthogonal to coil 38 contributes zero angular momentum by virtue of the fact that the atoms precess about $H_o$ which is collinear with the axis of coil 44. By setting oscillator 32 to a frequency $f_v$ such that the sum of $f_x$ and $f_v$ is equal to $f_o$, transitions can occur. Oscillator 32 may then be employed in the conventional manner in the feedback control system but at a much lower frequency so that $f_x/f_v = n >> 1$. Coil 44 can only produce transitions $\Delta\ m = 0$ while coild C produces transitions $\Delta\ m = \pm 1$. It is readily shown that if oscillator $O_x$ is crystal-controlled such that $f_x/f_v = n >> 1$, the relative instability $\Delta\ f_o/f_o$ of the oscillator system is decreased by that factor $1/n$ such that $$\Delta f_o/f_o = \Delta f_v/f_v^m$$

Figure 9A:
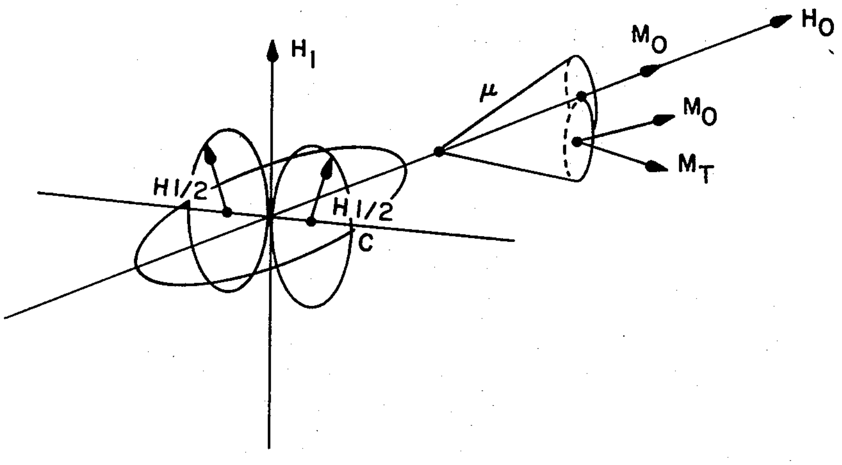
FIG. 9*a* illustrates the geometry of the fields in a relation to the precessing atoms in the field He.
Figure 9B:
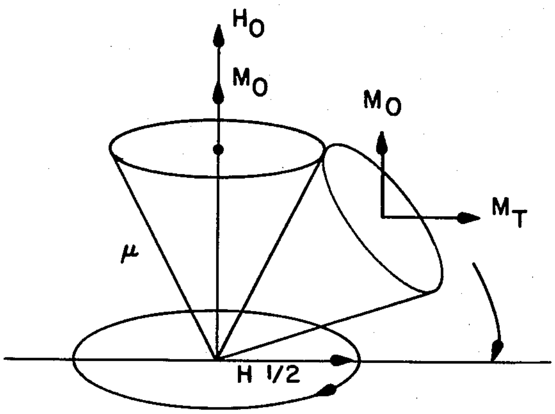
FIG. 9*b* illustrates the classical interpretation of a transition.

The arrangement shown in FIG. 8 virtually eliminates the frequency shift due to the Bloch-Siegert effect. Referring to FIG. 2, which illustrates the conventional magnetometer system, note that coil 38 which, as has been shown, provides the field for disorienting the atoms in the sublevel of the ground state, has its axis perpendicular to the ambient field $H_o$. The alternating magnetic field $H_1$ along the coil axis may be resolved into two components, each component circularly polarized with opposite senses of rotation, and magnitude $H_1/2$. FIG. 9a shows the geometry of the fields in relation to the precessing atoms in the field $H_o$. Prior to the application of the radio frequency field the atoms by virtue of their magnetic moments ($\mu$), precess about $H_1$ with random phase so that there exists no transverse magnetization ($M_T$), only longitudinal magnetization ($M_o$) in the direction of $H_o$. The magnetization ($M_o$) arises as is known from the orientation of atoms in the ground state sublevels as a result of optical pumping. Upon application of a circularly polarized (rotating) magnetic field of proper sign and whose frequency is in the neighborhood of the Larmor frequency $f_o$, the ensemble of atomic magnetic moments tends to tilt into the plane of $H_1/2$ due to the torque provided by the rotating magnetic field. For one orientation only one rotating component can produce the necessary torque. FIG. 9*b* illustrates from a classical point of view how this occurs. The tipping of the ensemble of moments provides a coherence to the ensemble producing a transverse magnetization ($M_T$). With the radio-frequency oscillator set $f_o$ tilting of the ensemble reaches a maximum and a "transition" is said to have occurred. It is apparent then that only one rotating component of magnetic field can cause the ensemble of atomic moments to undergo a transition from one sublevel to another. The oppositely rotating component removed in frequency by 2 $f_o$ would seem to exert negligible influence on the ensemble of atoms. That this is not so in all circumstances and particularly true in optically pumped magnetometers may be ascertained from the results published by Bloch and Siegert wherein it is shown that the oppositely rotating component of the radio frequency field produces a displacement in the resonant angular frequency $\omega_o$, such that $$\omega = \omega_o + [(\gamma H_1)^2/4\omega_o] \qquad (6)$$

Under the conditions of magnetometer operation the frequency displacement expressed in Eq. (6) may be significant.

Figure 10:
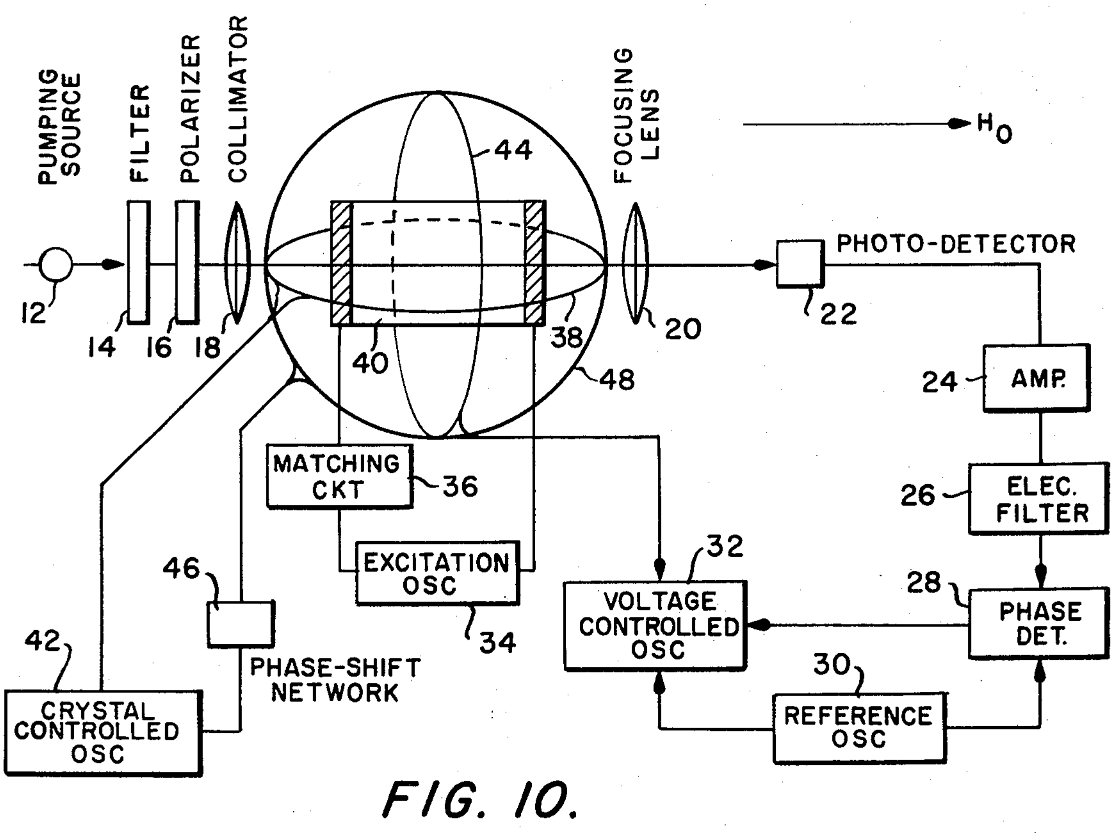
FIG. 10 is a schematic block diagram of an alternative configuration of a magnetometer embodying the features of the present invention.

An alternative configuration to FIG. 8 is that shown in FIG. 10, which eliminates the Bloch-Siegert effect. A third coil 48 orthogonal to both 38 and 44 is introduced and excited by the crystal-controlled oscillator 42 but with the phase of excitation shifted by 90° by network 46 (chosen to lead or lag, depending upon the direction of precession) thereby producing a single rotating field of proper sign. Since the frequency of the quartz-crystal controlled oscillator is fixed, the system once adjusted for the 90° phase shift need not be altered. The voltage-controlled oscillator operating at low-frequency as discussed above is again part of the feedback control system, and provides the variation in frequency necessary to adjust to the magnetic changes.

It has been demonstrated that use of multiple-quantum transitions provides an additional degree of freedom in the design of a radio-frequencydisorienting system for optically-pumped magnetometers. This extra degree of freedom permits one to design a system which not only eliminates the frequency shift due to the Bloch-Siegert effect but also reduces the instability of oscillator system. Such an improved oscillator system not only increases the accuracy with which magnetic fields may be measured, but also increases the sensitivity and dynamic range of the instrument. In allowing the voltage controlled portion of the oscillator system to operate at a much lower frequency the engineering difficulties of oscillator design are reduced. Design principles of crystal controlled oscillators are even more readily able to be put into practice.

The magnetometer system of the type considered here, has as its basis of operation a signal (absorption line) arising from "multiple-photon transitions," rather than "single-photon transitions." The former may be produced by a wide and theoretically limitless spectrum of frequencies (subject to conservation principles) providing signals which have in many cases absorption lines sharper than those produced by "single-photon transitions" as may be seen by the zero field line in FIG. 7 and thus able to measure extremely small fields. The use of multiple-photon transitions open a large area for experimentation where the interplay of several radio-frequency fields with various polarizations, produce in addition to the type of signal discussed, signals of a quite complex nature, different in appearance and possible use.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letter Patent of the United States is:

1. An optically pumped magnetometer comprising:
an absorption cell containing a gas,
source means for pumping light at said absorption cell situated on one side of said absorption cell,
photodetector means situated on the other side of said absorption cell,
phase detector means coupled to said photodetector,
an excitation oscillator for exciting said absorption cell,
a first disorienting coil circumferentially extending around said absorption cell,
a voltage controlled oscillator for energizing said first coil with a frequency $f_v$
a reference oscillator coupled to said voltage controlled oscillator and said phase detector for frequency modulating said voltage controlled oscillator,
a second disorienting coil circumferentially extending around said absorption cell and orthogonal to said first coil,
a crystal controlled oscillator for energizing said second coil with a frequency $f_1$,
wherein said frequency $f_1$ is much greater than said frequency $f_v$ and the sum of said two frequencies equals the resonant frequency of said magnetometer, whereby multiple quantum transitions are created in said gas, and
wherein said phase detector drives the frequency of said voltage controlled oscillator according to the photodetector output signal, whereby the magnetic field may be determined from said voltage controlled oscillator frequency.

2. An optical pumped magnetometer as recited in claim 1 further comprising:
a filter coupled to said pumping source, a polarizer coupled to said filter, and a collimating leans coupled between said polarizer and said absorption cell,
a focusing lens coupled between said absorption cell and said photodetector, an amplifier coupled to said photodetector, and an electrical filter coupled between said amplifier and said phase detector, and
a matching circuit coupled between said excitation oscillator and said absorption cell,
wherein said collimating lens and said focusing lens are positioned to maximize the energy at the surface of said photo-detector and provide uniform irradiation over the cross sectional area of said absorption cell,
wherein said pumping source uses the same type of atoms as said absorption cell, and
wherein the signal at said photodetector is an audio signal whose amplitude is proportional to the slope of the absorption line at the frequency of said resonant frequency of said magnetometer.

3. An optical magnetometer as recited in claim 2 wherein said absorption gas comprises helium.

4. An optical magnetometer as recited in claim 3 further comprising
a third disorienting coil circumferentially extending around said absorption cell and orthogonal to both said first coil and said second coil, and
a 90° phase shift network coupled between said crystal controlled oscillator and said third coil.

* * * * *